UNITED STATES PATENT OFFICE.

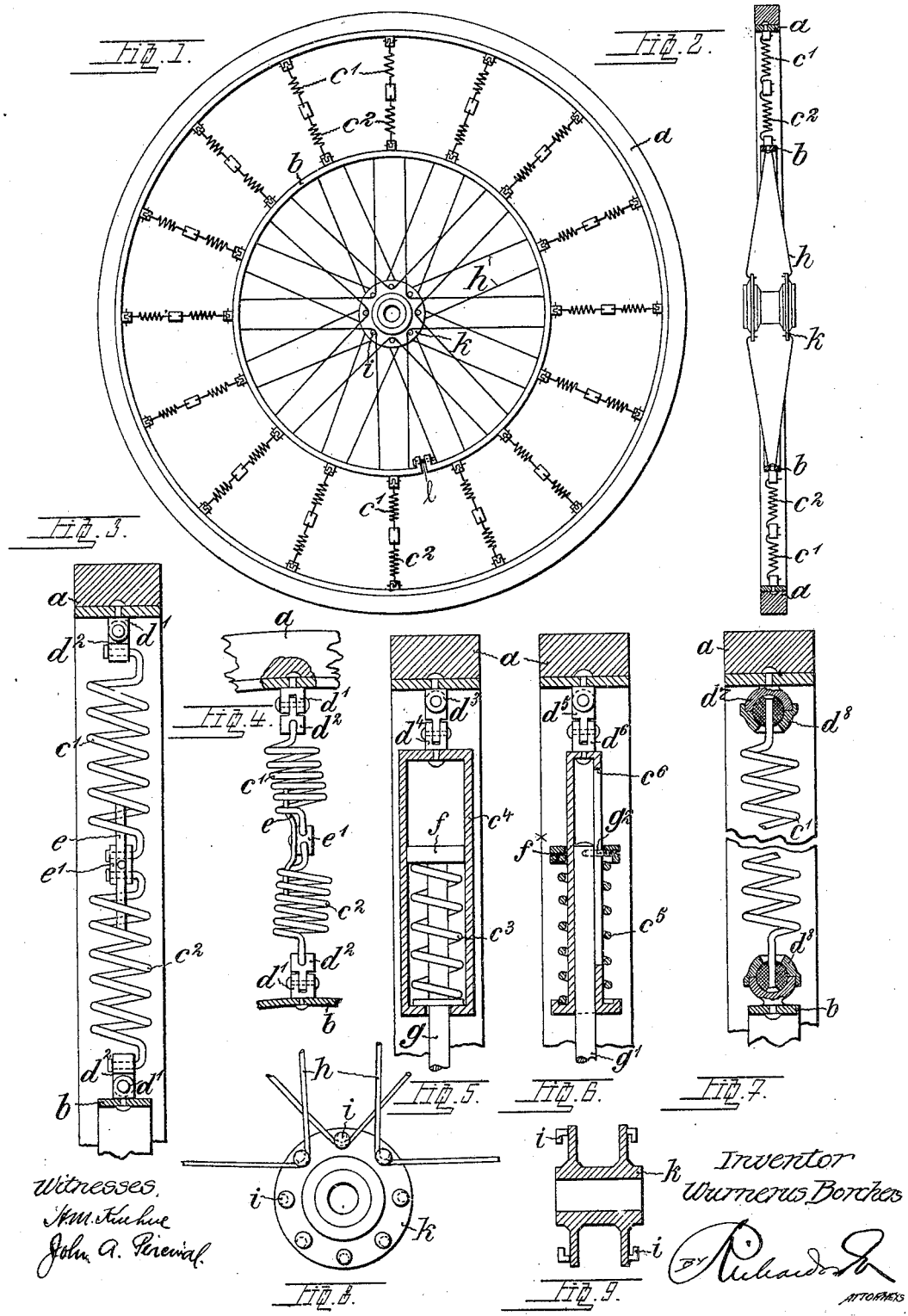

WARNERUS BORCHERS, OF BERLIN, GERMANY.

ELASTIC WHEEL.

No. 804,202.
Specification of Letters Patent.
Patented Nov. 14, 1905.

Application filed January 21, 1904. Serial No. 190,087.

*To all whom it may concern:*

Be it known that I, WARNERUS BORCHERS, a subject of the German Emperor, residing in Berlin, Prussia, Germany, (whose post-office address is 46 Potsdamerstrasse, Berlin, Germany,) have invented certain new and useful Improvements in Elastic Wheels, (for which I have applied for a patent in Germany, filed the 8th of April, 1903,) of which the following is a specification.

This invention relates to an elastic wheel suitable for automobiles, pleasure-carriages, and other vehicles, and has for its object to keep the carriage-body free from the shocks and vibrations which are produced by traveling over an uneven road. Hitherto the attempts made for producing such a wheel have not been very successful. The majority of these attempts were based on the idea to connect the rim of a solid wheel with a rim of larger diameter by means of springs or spring mechanism, and according to the arrangement of such springs—viz., for compression or for tension—two classes of experiments may be distinguished. If compression-springs were used, they had the tendency to press the outer rim sidewise out of the plane of the wheel, so as to impart to the entire wheel the shape of a truncated cone, the two bases of which were formed by the planes of the two wheel-rims. Consequently these attempts have been almost abandoned. Among tension-springs—that is to say, springs which are subject to tensile strains when the wheel is at rest or in a horizontal position—those which are placed radially to the wheel-rims have the advantage of simplicity over any others. If such springs are rigidly fixed to the hub, they are subject to distortion in a longitudinal direction during the motion of the loaded vehicle and to bending strains at the point of attachment to the hub, and as these strains recur several times during every revolution of the wheel the springs break or become useless after a short time.

The present invention has for its principal object to avoid the breaking of the radial tension-springs at the point of attachment. For this purpose the springs are constructed as elastic links. In other words, they are attached to the rim by pivotal joints. Supposing that the axle of such a wheel is loaded, the inner rim will be displaced downward, and the radial springs situated in the upper half of the wheel, which have already been in tension, are thereby stretched. The springs which are situated in the lower half of the wheel and connected with the flattened part of the outer rim resting on the ground are compressed. The heaviest tensile strains occur in the springs, which are inclined at an angle of about forty-five degrees, because at these points the outer rim is bulged out under the influence of the load, and the same springs deviate also farther from their radial position than the others. Consequently in the absence of pivotal or movable joints these springs would be also more liable to break at their points of attachment than the other springs. In some cases—for instance, when the wheel is running through a curve or when it meets a lateral resistance—a relative displacement of the two wheel-rims may occur in such a manner that the inner rim leaves the plane of the wheel. Consequently the springs connecting the two rims must be adjustable also in a direction parallel to the axis of the wheel. This double adaptability of the springs—that is to say, both in the plane of the wheel and in a direction perpendicular to the same—is produced by providing them with cross-joints, spherical, or similar joints. As mentioned above, the springs situated in the lower half of the wheel are under compression. In some cases this compression is so strong as to produce permanent deformation or even rupture of the springs. To avoid this danger, every individual spring may be divided in or about the middle of its length. In other words, it may be composed of two helically-coiled springs joined together by a flat spring, so as to facilitate the formation of an angle between the two halves of the spring. As long as the helical springs are under tension the axes of the two halves will naturally form a straight line, and the flat spring is not required; but as soon as the spring is in a position of rest or under compression the flat connecting-spring will form an angle between the two halves.

In the accompanying drawings, Figure 1 is a face view, and Fig. 2 a vertical section, of a vehicle-wheel embodying my invention. Figs. 3 to 9 represent details of construction on a larger scale.

As shown by Fig. 1, the outer rim $a$ is connected with the inner rim $b$ by elastic links which are composed of helical springs $c'$ $c^2$, arranged radially. Fig. 3 represents a spring-link connected by ordinary cross-joints $d'$ $d^2$ both with the inner rim $b$ and with the outer rim $a$. Each cross-joint is composed of a forked eyepiece $d'$, riveted to the rim, and a single eyepiece $d^2$, forming with the forked piece an ordinary hinge-joint, the axis of which is perpendicular to the axis of the wheel. The hinge-piece $d^2$ has also a perforation at right angles to the hinge to receive the bent extremity of the outer half of the helical spring $c'$ or $c^2$, which is secured by a screw-nut and capable of turning in the said perforation. The two halves $c'$ $c^2$ of the spring-link are joined together by bending their adjoining extremities at right angles and passing them through a pair of holes formed in a block $e'$, fixed to a flat spring $e$, which extends into the interior of the helical springs $c'$ $c^2$. When the axes of the springs $c'$ $c^2$ form a straight line, as represented by Fig. 3, the flat spring $e$ forms a straight line situated approximately in the axis of the springs $c'$ $c^2$. When the springs $c'$ $c^2$ are compressed, they assume the shape and position represented by Fig. 4—that is to say, adjacent extremities of the springs $c'$ $c^2$, which are bent at right angles to the axes of the springs and form pivots passing through holes of the block $e'$, turn slightly in the said holes, and the spring $e$ is bent so as to allow the axes of the two springs to form an obtuse angle with each other.

Instead of composing the elastic link of two halves $c'$ $c^2$, connected by a flat spring, as shown by Figs. 3 and 4, I may inclose and guide a helical spring $c^3$ in a cylindrical casing $c^4$, connected with the outer rim by a cross-joint $d^3$ $d^4$, as shown by Fig. 5, while the connection with the inner rim is established by means of a piston $f$ and rod $g$, movable in the said casing $c^4$ and connected with the inner rim by a cross-joint (not shown) in order to avoid the deformation of the helical spring under heavy compression strains. A similar construction is shown by Fig. 6, where the helical spring $c^5$ is guided outside the casing or tubular rod $c^6$, connected with the outer rim by a cross-joint $d^5$ $d^6$, while the necessary abutment for the spring is formed at one end by a flange of the casing $c^6$ and at the other end by a ring $f^x$, adapted to slide on the casing $c^6$ and connected with the end of the piston-rod by an arm $g^2$, passing radially through a longitudinal slot of the casing $c^6$.

The construction represented by Fig. 7 differs from that shown by Figs. 3 and 4 by the substitution of ball-and-socket joints $d^7$ $d^8$ for the cross-joints $d'$ $d^2$.

To facilitate the manufacture of the wheel, the spokes are made in pairs—that is to say, contiguous spokes are made of one piece $h$, forming an angle where they join the hub, as represented by Figs. 1 and 8. They are simply hooked onto the studs $i$, projecting from the face of the hub $k$, as illustrated by Figs. 8 and 9, or they are passed through corresponding holes formed in the hub instead of the studs $i$. The outer ends of the spokes are fixed to the inner wheel-rim by riveting or by screw-joints.

For regulating the tension of the spokes the inner rim $b$ is divided or composed of two or more segments, and the adjoining segments are held together by screw-bolts $l$, provided with right and left hand threads, so that by turning the bolts more or less to the right or to the left the circumference of the rim $b$ may be increased or reduced within given limits, and thereby the necessary tension imparted to the spokes $h$.

What I claim is—

1. In an elastic wheel having two concentric rims, a hub, spokes connecting the same with the inner rim, universal joints secured to the inner and outer rims and a plurality of elastic links interposed between the inner and outer rim and connected to said joints.

2. In an elastic wheel having two concentric rims, a hub, spokes connecting the same with the inner rim, pivotal joints secured to the inner and outer rims and a plurality of elastic links interposed between the inner and outer rim and pivotally connected to said joints.

3. In an elastic wheel having two concentric rims, a hub, spokes connecting the same with the inner rim and a plurality of elastic links interposed between the inner and outer rim and connected with the same by pivotal joints, each link being composed of two lengths capable of limited relative motion, so as to vary the total length of the link, substantially as described and for the purpose specified.

4. In an elastic wheel having two concentric rims connected with each other by means of springs, a plurality of elastic links interposed between the inner and outer rim and connected with the same by pivotal joints, each link being composed of two helical springs placed axially one behind the other and joined together by means of a flat spring adapted to be bent sidewise by the compression of the springs, substantially as described.

5. In an elastic wheel having two concentric rims joined together by a plurality of elastic links, an expansible inner rim connected with the hub by tension-spokes arranged in pairs, each pair being made of one piece and forming an angle at the hub, while the ends are fixed to the inner rim, substantially as described and for the purpose specified.

In witness whereof I have hereunto signed my name in the presence of two subscribing witnesses.

WARNERUS BORCHERS.

Witnesses:
WOLDEMAR HAUPT,
HENRY HASPER.